March 24, 1959

D. C. COX 2,879,407

INSPECTION HEAD FOR SORTING MACHINE

Filed June 3, 1953

INVENTOR.
DAVID C. COX

BY
RICHEY, WATTS, EDGERTON & McNENNY

Frederic B. Schramm

ATTORNEYS

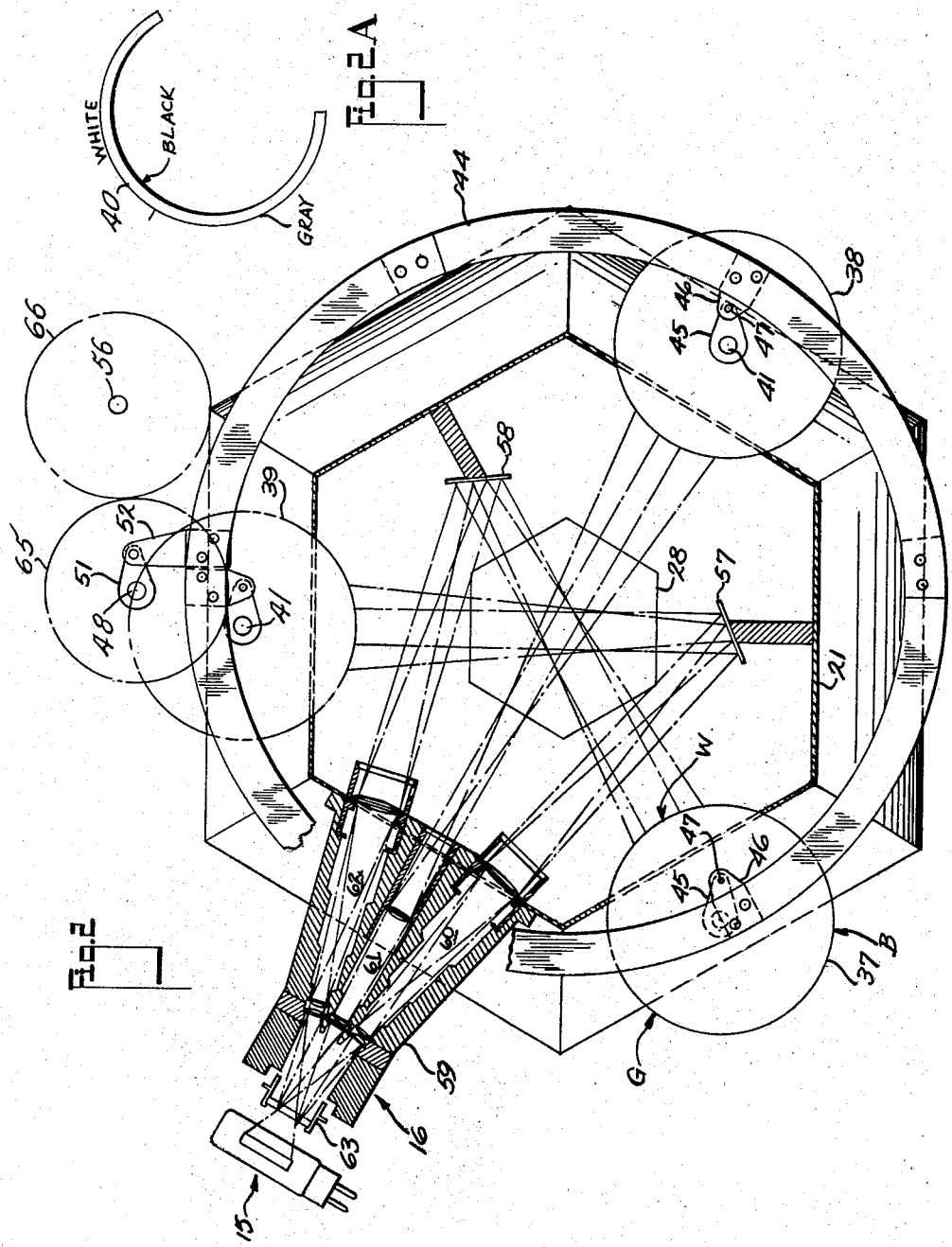

United States Patent Office 2,879,407
Patented Mar. 24, 1959

2,879,407

INSPECTION HEAD FOR SORTING MACHINE

David C. Cox, Grand Rapids, Mich., assignor to Mandrel Industries, Inc., a corporation of Michigan Application June 3, 1953, Serial No. 359,347

17 Claims. (Cl. 250—222)

This invention relates to sorting articles by photoelectric means while the article is falling freely and concerns more particularly methods and apparatus responsive to surface reflectivity of articles, such as their color for example.

This application is a continuation-in-part of my copending application, Serial No. 294,427, filed June 19, 1952, now Patent No. 2,833,937. An object of the invention is to regulate periodically the resposne of photoelectric devices used to inspect freely falling articles.

A more specific object is to calibrate or set amplifiers used with photoelectric devices in light responsive inspection or sorting.

A further object is to provide automatic recalibration throughout the operating range of the apparatus by periodically setting two points on a linear characteristic curve.

It is thus an object to provide for accurate classification of sorted articles into a plurality of different categories without requiring separate calibration or comparison with a standard at each of the operating points representing such classifications or categories.

Another object of the invention is to correlate the inspection and calibration operations in a photoelectric sorting machine of the type which determines the surface reflectivity characteristics of an article while the article is falling freely.

Another object of the invention is to provide the same succession of reflecting surfaces in a plurality of light transmission paths.

Still another object of the invention is to insert a succession of differing light reflecting surfaces simultaneously in each of a plurality of light transmission paths and to do so in exact synchronism with the operation of associated apparatus.

A further object of the invention is to accomplish a close approach to the properties of a theoretical black body in presenting a surface representative of negligible light reflectivity or "blackness."

There are described in the aforesaid parent U.S. patent application, Serial No. 294,427, filed June 19, 1952, by D. C. Cox (now Patent No. 2,833,937), novel methods of and apparatus for inspecting fruit and the like according to the surface light reflectivity characteristics of each specimen, such as, for example, by the color of the specimen. The fruit is inspected by a photoelectric system which illuminates each specimen and directs the reflected light upon a photoelectric tube. The variations in photoelectric current due to the variations in color, etc. are then utilized to control various diverter gates or the like for separating the fruit into different classes corresponding to the response from the photoelectric tube.

The features and advantages of that sorting method and apparatus are determined largely by the fact that the fruit is illuminated indirectly by diffused light and the nature of the light reflected from the fruit is determined solely while the fruit is falling freely in air and out of contact with supporting elements of any kind. The entire surface of each specimen of fruit can, therefore, be scanned and every variation in color and every blemish or fault on the surface of the specimen affects the photoelectric tube.

It is an important aspect of the operation of the apparatus described above that it is periodically calibrated and that the electric circuits, including the photoelectric tube, are periodically compensated and regulated, e.g. corrected to predetermined conditions at two different points during intervals between the inspection of the separate specimens of fruit. The compensation and regulation or calibration are accomplished by the provision of a plurality of background elements each having a succession of surfaces having differing light reflecting characteristics about the periphery thereof. The background elements include a plurality of standard surfaces for example, "white" and "black," such that when no article is under inspection the light reflected from such a surface of the background element falls upon the photoelectric tube and serves to produce a standard or reference response from the tube, representing "white" response or "black" response or the like. Such a background arrangement is provided together with a suitable drive apparatus whereby the background elements may be operated in exact synchronism with the means which is utilized to drop the articles preparatory to inspection.

Further objects, features and advantages will be more readily understood from a consideration of the following detailed description considered in conjunction with the appended drawings, in which:

Fig. 2 is a vertical view shown partly in section and partly in schematic showing particularly the ring drive for the background elements and the relative disposition of the optical components of the apparatus.

Fig. 2A is a detailed view of the shell of one of the background elements.

Figure 1:
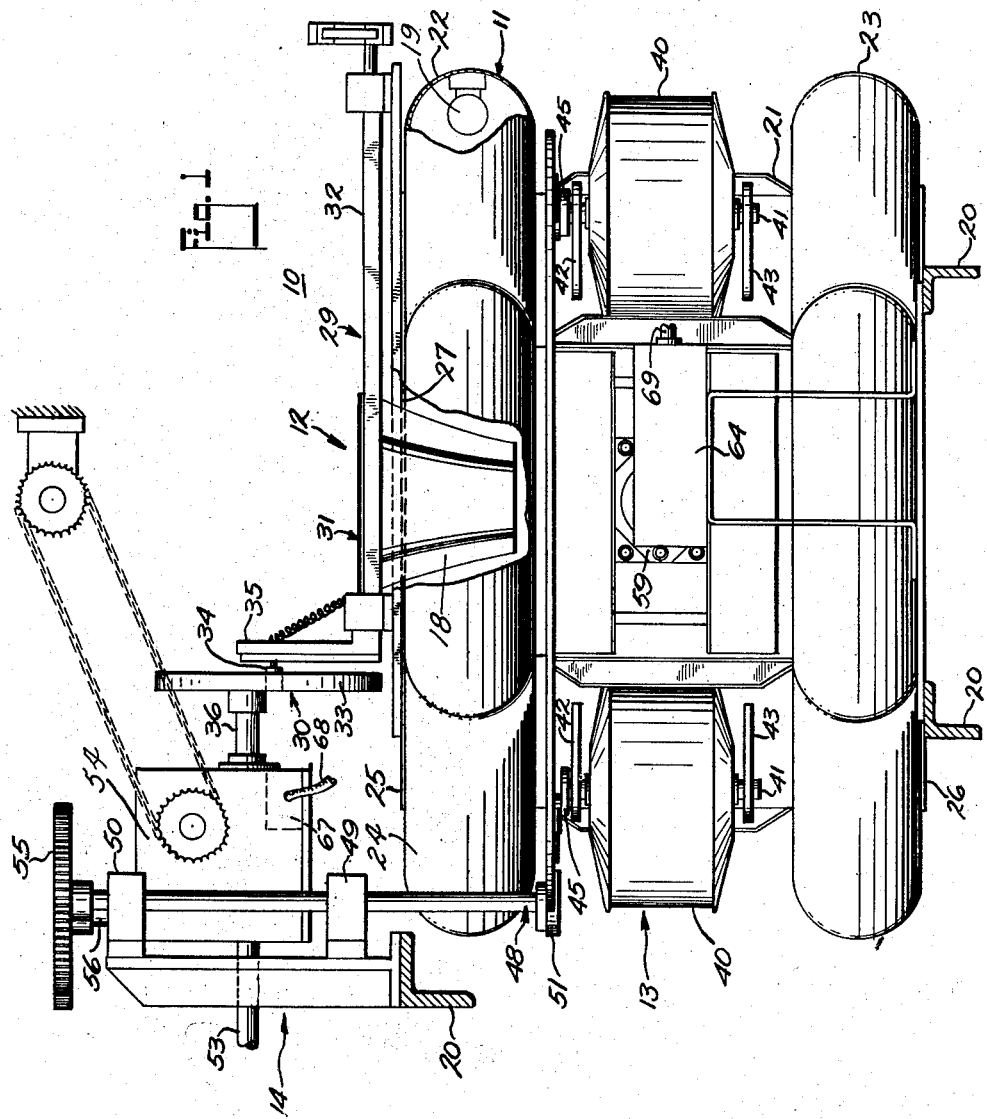
Fig. 1 is a front elevation of the apparatus of the invention.

Referring now to the drawings, the sorting apparatus 10 comprises an inspection head 11; article release mechanism 12; background apparatus 13; a drive mechanism 14; and light-receiving means such as a light-responsive unit comprising a phototube 15 and a lens system 16.

The inspection head 11 is mounted upon and supported by a frame 20 and comprises a lamp housing including a body member 21 and two lamp troughs or channels 22 and 23. The body member 21 is hexagonal in shape and is formed of flat sheet metal members. The lamp troughs 22 and 23 are also hexagonal in shape of horizontal cross-section and serve to enclose a plurality of lamps 19 (e.g. six in each housing) which are supported by the walls of the housing by means such as a lamp mount 24. The walls of the troughs 22 and 23 are arcuate in shape of vertical cross-section and direct the light from the lamps uniformly toward the center of the body member 21. The nature and construction of the inspection head will be further evident from the disclosures of my copending application, Serial No. 294,427 referred to above (now Patent No. 2,833,937) and my copending applications, Serial No. 326,496, filed December 17, 1952 (now abandoned) and Serial No. 330,238, filed January 18, 1953 (now Patent No. 2,825,456), respectively. The use of a number of lamps at the top and bottom of the inspection head together with the proportions and arrangement of the lamp troughs and shields 18 provides diffused light giving a uniform illumination of the article being inspected, as set forth in application, Serial No. 294,427.

The upper lamp trough 22 supports a top wall member 25 while the lower lamp trough 23 supports a bottom wall member 26. An opening 27 in the top wall member 25 and an opening 28 in the bottom wall member 26 define a passage through which an article to be inspected may fall.

The release mechanism 12 in the form of apparatus shown by way of illustration comprises a gate mechanism 29 and a drive mechanism 30. The gate mechanism serves to support an article which is to be inspected and upon actuation by the drive mechanism 30 drops the article into the inspection head.

As shown particularly in Fig. 1, the gate mechanism 29 comprises an article holder 31 including a plurality of separate leaves mounted upon an actuating shaft 32. Upon rotation of the shaft, the article holder 31 is opened to drop the article. The shaft 32 is rotated by the drive mechanism 30 including the cam 33, a follower 34 and an arm 35 secured to the end of the shaft 32. As disclosed particularly in the applications referred to above, the cam 34 is so contoured that the article holder 31 is opened very rapidly and at a time precisely determined by the drive mechanism. Moreover, the article falls from a precisely determined center point in a fixed plane and is acted upon by no force other than the acceleration of gravity. Consequently its path is fixed as a vertical line down the center of the inspection head 11. It is, therefore, possible to obtain precisely intermittent release of the articles to be inspected in an arrangement which is driven by a continuously rotating shaft 36.

The background apparatus includes three background elements 37, 38 and 39. Each background element comprises a drumlike member 40 which has the periphery thereof divided into three portions or segments. As shown in Fig. 2, one portion B of the wall of the drum comprises a black surface, another portion W a white surface, and the third portion G a gray surface. The black segment may result as shown in Fig. 2A from omitting the corresponding segment of the drum 40 and painting the inner surface of the remaining segment black. The mode of functioning of the successive surfaces in the operation of the sorting machine and the practice of the method of that machine is set forth in the application, Serial No. 294,427, now Patent No. 2,833,937 referred to above.

Each drum 40 is mounted upon a vertical shaft 41 which is supported by and rotates upon two bearing members 42 and 43 which are attached to the walls of the body member 21.

The drums 40 are interconnected by a link 44 which surrounds the body member 21 of the inspection head and is connected to a crank 45 mounted at the upper end of each of the shafts 41. The link 44 comprises a ringlike member which surrounds the body member 21 of the inspection head and is connected to the cranks 45 by means of projecting links 46 and pins 47. The link 44 is actuated by a drive shaft 48 which is mounted in bearings 49 and 50 and carries a crank 51 at the lower end thereof. The crank 51 is connected to the link 44 by means of a projecting piece 52 which is rigidly secured to the circular member.

The shaft 48 is driven at a constant speed and in synchronism with the shaft 36 by the drive apparatus 14. The drive apparatus 14 comprises a main drive shaft 53 which is suitably driven by the main drive motor of the sorting machine, a gear box 54 and background gears 55. The gear box drives the shaft 36 at a suitable speed such as to actuate the gate mechanism at the desired rate for the operation of the machine. The background gears 55 are driven by the gear box 54 through a shaft 56 and so that the shaft 48 rotates at the speed required for the proper operation of the drums 40. The relative positioning of the background gears 55 is shown schematically in Fig. 2 by their pitch circles 65 and 66.

The apparatus of the invention includes means for directing light which is reflected from the surfaces of the background elements 37 or from a falling fruit specimen upon the photoelectric tube 15. The entire directing means includes reflecting elements 57 and 58 within the body member 21, and the lens system 16. The lens system 16 includes a mounting 59 and three sets of lenses 60, 61 and 62. The light which passes from the background, or the articles when an article is present, to the reflecting elements and to the three lenses 60, 61 and 62 is directed upon the cathode of the phototube 15 by means of a condensing lens 63. The path of travel of the light reflected from the elements 37 from the surfaces of the drum to the anode of the photoelectric tube 15 are shown in dotted outline.

As shown in Fig. 1, the photoelectric tube 15 is supported by a conventional mount 64 including a vacuum tube amplifier circuit.

The gear box 54 includes a switch unit section 67 driven by the shaft 53 and containing cam switches, drum switches or the like for synchronizing the operation of the release mechanism 12 and the rotation of the drums 40 with the actuation of electrical circuits and light and dark responsive calibrating mechanism included in the photo-electric amplifier circuits in the photo-electric mounting box 64, for regulating and compensating the response of the tube 15 in the manner described in more detail in my parent application. An interconnecting cable between the switch unit 67 and the amplifier box 64 is represented in Fig. 1 for simplicity wth all but the ends 68 and 69 broken away.

In operation, the article to be inspected is supported by the release mechanism 29 until such time as the release mechanism 29 is actuated by the cam 33. The article is then dropped into the passage formed by the openings 27 and 28 and is illuminated both from above and below by diffused light from the lamps 19 enclosed in the housing 22 and 23.

The background elements 37 have, in the meantime, been rotated so that, as the article reaches a vertical position centrally of the lamp housing where it is evenly illuminated from all sides, about at the level of the drums 40, and the light reflected from the article falls upon the photoelectric tube 15, the portions of the drums 40 which carry the gray reflecting surfaces G are directed inwardly and exposed to the illumination within the lamp housing. That portion of the drum continues to be presented until the article reaches a vertical position which is below the lower limit of the transmission path from the article to the drums and to the photoelectric tube. As the article passes below this lower limit and out of inspection range, the drums are rotated to the first of the remaining two reflection surfaces whereupon the photoelectric system is compensated or regulated for that shade. By the time that operation has been completed, the succeeding reflection surface has moved into view and the photoelectric system is regulated or compensated for the remaining shade. One of the remaining two reflection surfaces of the drums 40 is black and the other white, so that two-point, white and black calibration of the photoelectric amplifier circuits may be accomplished while there is no article in the field of view. The release mechanism then drops another article and the entire process is repeated.

The photoelectric amplifier is provided with an output circuit adjustably arranged for tripping an article diverting or classifying mechanism whenever an article of any desired degree of light reflectivity (or in some cases color) falls through the lamp housing. For multichannel or multilane operation the diverter mechanism is arranged to classify articles by distributing them to different receptacles for different degrees of light reflectivity as explained in my parent application. The fact that the amplifier is set or calibrated at two different points by the use of the white and black backgrounds results in the apparatus being arcuate at each different point when a separate classification is desired and therefore renders the apparatus suitable for multilane or multichannel operation with the sorted articles being distributed in different lanes or channels by separate trip circuits.

Although the calibrating background sectors have been referred to as "black" and "white," they need not literally be black and white but may be of any color or hue so long as one has low reflectivity or very nearly zero reflectivity and the other has a high reflectivity which may be accurately maintained substantially constant. Likewise the "grey" section may be colored and is referred to as "grey" to specify that it has an intermediate reflectivity.

The function of the grey background sector is to avoid incorrect tripping of the article diverting mechanism in case of irregular action of an article falling through the lamp housing.

In order to scan articles which fall a little early and those which fall a little late, as well as those which fall precisely in time, it is necessary to actuate all trip circuits before any article enters the field of view, even early ones, and to maintain the active condition until even late articles have passed.

Thus, there is an opportunity for one or more trip channels or lanes to be actuated by the background alone, either before a lemon has entered the field or after it has passed. It is therefore necessary to provide a background whose reflectivity is one which will be ignored. One lane is always provided in which articles go which have not actuated any trip circuits and the "grey" background is located somewhere within this zone. It need not be of a precise reflectivity but only of some value within the ignored zone.

In the preferred embodiment as described above and illustrated, the background drums have three sections. In operation an article is viewed, then before another enters the field of view both the black and white settings are checked. This method is suitable for cases where there is ample time between the amount of articles for making both settings and for presenting both the white and black backgrounds. An alternative using four sections, black, grey, white and gray is used in cases where there is only sufficient time between articles for making one setting.

It is to be understood that the specific nature of the present disclosure is not intended to be restrictive or confining and that various rearrangements of parts and modifications of design may be resorted to without departing from the scope or spirit of the invention as herein claimed.

What is claimed is:

1. In an article sorting machine, the combination of a light source adapted to illuminate an article while it is moving along an inspection path, a photoelectric device, a background element disposed adjacent the inspection path of the article and adapted to be illuminated by the same source, the background element comprising a plurality of reflection surfaces and the background element being adapted to be positioned so that each of said reflection surfaces in succession will be illuminated by the source, means for directing light reflected from the background element or an article in the inspection path upon the photoelectric device, and synchronized means for directing an article into the inspection path and thereafter changing the positioning of the said background element so as to present at least one of the reflection surfaces in the presence of an article for inspection and at least one of the surfaces at a subsequent time for regulating the response of the photoelectric device.

2. In an article sorting machine, the combination of a light source adapted to illuminate an article while it is moving along an inspection path, a photoelectric tube with an associated circuit, a plurality of background elements positioned about the inspection path of the article and adapted to be illuminated by the source, each background element comprising a plurality of reflection surfaces, each of the background elements being adapted to be positioned so that each of the said reflection surfaces in succession will be illuminated, means for directing light reflected from the surfaces upon the tube, and synchronized means for directing an article into the inspection path and thereafter changing the positioning of the said background elements so as to present at least one of the reflection surfaces in the presence of an article for inspection and at least one of the surfaces at a subsequent time for calibrating the phototube.

3. In an article sorting machine of the optical type adapted to inspect an article while the article is moving along an inspection path, the combination of a light source, a plurality of background elements positioned about the path of travel of the article to be inspected and adapted to be illuminated by the light source, each background element comprising a plurality of reflection surfaces and each of the background elements being adapted to be positioned so that each of the surfaces in succession will be illuminated, light-receiving means, means for directing light reflected from the surfaces into the light-receiving synchronized means, and means for directing an article into the inspection path and thereafter successively twice changing the position of the said background elements so as to present at least one of the reflection surfaces in the presence of an article for inspection and two of the surfaces in succession at other times for calibration of the apparatus.

4. In a sorting machine adapted to inspect an article while the article is in free fall, the combination of an inspection head comprising a housing having vertical side walls and defining a passage for the fall of the article, a background element mounted on one of the side walls, the said background element comprising a rotatable drum-like member having a succession of reflecting surfaces of different shades on the periphery thereof, one at a time being exposed to the interior of the said inspection head, means for illuminating such exposed surface, a photoelectric device and means for directing light reflected from the illuminated surface of the said drum-like member upon the photoelectric device.

5. In a sorting machine adapted to inspect an article while the article is in free fall, the combination of an inspection head comprising a housing having vertical side walls and defining a passage for the fall of the article, a plurality of background elements mounted on the side walls of the housing and disposed about the path of fall of the article, the said background elements comprising drum-like members each having a succession of reflection surfaces of different shades on the periphery thereof, one at a time being exposed to the interior of the said inspection head, means for illuminating said exposed surfaces, photoelectric means, and means for directing light reflected from a surface of the said drum-like member upon the photoelectric means.

6. In a sorting machine adapted to inspect an article while the article is in free fall, an inspection head comprising a housing having vertical side walls and defining a passage for the free fall of the article to be inspected, means for illuminating the passage, a plurality of background elements disposed about the passage, each element comprising a drum-like member, the said drum-like member being received in openings in the side walls of the housing whereby a portion of the side wall of the member is exposed to the illumination in said passage, a vertical shaft for each drum-like member and bearing members for the shafts attached to the housing to permit rotation of the said members, means for rotating the drum-like members comprising a crank at the end of each shaft, a circular link disposed about the housing and connected to the cranks, a drive shaft, and a crank at the end of the drive shaft connected to the link, a photoelectric device, and means for directing light reflected from the said drum-like members upon the photoelectric device, the said background elements being rotated so as to present a reflection surface of one shade during the inspection of an article and reflection surfaces of one or more other shades at a subsequent time.

7. In a sorting machine adapted to inspect an article while the article is in free fall, the combination of an inspection head housing having a vertical passage through which articles may fall, release mechanism for dropping articles into the passage, the article being illuminated while falling in the passage, a plurality of rotating background elements disposed about the passage, each element having a succession of surfaces about the periphery thereof differing in reflectivity and arranged to be exposed to the passage, one at a time, and means for rotating the background elements from one surface exposing position to another in synchronism with the actuation of the release mechanism to expose one of such background surfaces of each background element while an article is in the passage, and other surfaces while no article is in the passage.

8. The invention in accordance with claim 7, the said rotating means comprising intermittently operative means for the said release mechanism and continuous drive means for the said background elements.

9. The invention in accordance with claim 7, the said rotating means comprising a cam and follower for actuating the release mechanism at a predetermined time and drive means for rotating the background elements with the cam.

10. The invention in accordance with claim 7, the said rotating means including a continuously rotating cam for the release mechanism, a continuously rotating drive for the background elements and gear means coupling the said cam and the said drive.

11. In a sorting machine adapted to inspect an article while the article is in free fall, an inspection head comprising a housing having vertical side walls, a plurality of background elements disposed about the housing, each element comprising a drum-like member and a vertical shaft, bearing members for the shafts attached to the housing, a crank at the end of each shaft, a link connecting the cranks, a vertical drive shaft, and a crank at the end of the drive shaft connected to the link, the said cranks having the same direction whereby rotation of the drive shaft produces simultaneous rotation of the background elements.

12. In a sorting apparatus of the optical type, the combination of a background unit having areas of different reflectivity for calibrating the sorting apparatus, mechanism for presenting successive surface portions of the background unit to the apparatus in succession, one of said background surface portions being relatively light and another being relatively dark, light-responsive and dark-responsive calibrating mechanism in the apparatus, and means for synchronizing said calibrating mechanism with the mechanism for presenting the successive areas of the background unit to the apparatus, whereby a relatively light portion of the said background unit is presented to the apparatus when the light-responsive calibrating mechanism is being actuated, and a relatively dark portion of said background unit is presented to the apparatus when the dark-responsive calibrating mechanism is being actuated.

13. As an article of manufacture, a background unit for an optical sorting machine in which areas of different degrees of reflectivity are utilized for calibrating the sorting apparatus, said unit comprising a hollow cylinder having a portion of the periphery thereof provided with an external surface which is relatively light and another portion with an external surface which is darker than the first-mentioned surface and having a third portion of the periphery thereof cut away with the internal surfaces of the remaining portions darker than either of the external surface portions.

14. As an article of manufacture, a background unit for an optical sorting machine in which areas of different degrees of reflectivity are utilized for calibrating the sorting apparatus, said unit comprising a hollow cylinder having a portion of the periphery thereof provided with an external surface which is relatively light, and having another portion of the periphery thereof cut away, with the internal surface of the cylinder darker than said external surface portion.

15. A drive mechanism for a plurality of rotating optical background members positioned about a central member symmetrically disposed with respect thereto, comprising a crank secured to each background member, a circular link connected to the said cranks at uniformly spaced points around the periphery of said central member and symmetrical with respect to the center thereof, a drive shaft, a crank on the drive shaft, a connection between the drive crank and the link, means for releasing articles to be viewed in conjunction with the background member, and a connection between the release means and the drive shaft for synchronizing the operation.

16. The method of sorting articles which includes as steps thereof dropping the article, illuminating the article from all sides thereof while the article is falling freely, directing light reflected from the article upon a phototube, reflecting background light upon the photo tube with one degree of reflectivity while the reflected light from the article is directed upon the photo tube and thereafter reflecting background light upon the photo tube with a different degree of reflectivity for compensating the response of the phototube in accordance with the characteristics of the second surface.

17. The method of sorting articles which includes as steps thereof dropping an article, subjecting the article to substantially uniform diffused illumination free from direct rays from any light source, directing light reflected from the article upon a phototube to determine the surface characteristics of the article, subsequently reflecting background light upon the photo tube with a predetermined degree of reflectivity differing from that of the expected articles to be sorted for calibrating the response of the phototube for such surface.

References Cited in the file of this patent

UNITED STATES PATENTS

| 1,696,468 | Buhr | Dec. 25, 1928 |
| 2,228,560 | Cox | Jan. 14, 1941 |
| 2,656,923 | Cox | Oct. 27, 1953 |

FOREIGN PATENTS

| 13,930 | Great Britain | of 1895 |
| 366,805 | Germany | Jan. 11, 1923 |